United States Patent
BuAbbud et al.

(10) Patent No.: US 7,486,892 B2
(45) Date of Patent: Feb. 3, 2009

(54) MULTIPORT OPTICAL AMPLIFIER WITH NARROWCAST POWER EQUALIZATION

(75) Inventors: George BuAbbud, Shrewsbury, MA (US); Dennis P. Leonard, Jr., East Brookfield, MA (US); Wolfram Bern Fuchs, Brimfield, MA (US); Igor Samartsev, Moscow (RU)

(73) Assignee: IPG Photonics Corporation, Oxford, MA (US)

( * ) Notice: Subject to any disclaimer, the term of this patent is extended or adjusted under 35 U.S.C. 154(b) by 0 days.

(21) Appl. No.: 11/197,005

(22) Filed: Aug. 4, 2005

(65) Prior Publication Data

US 2005/0271385 A1      Dec. 8, 2005

Related U.S. Application Data

(63) Continuation of application No. PCT/US2004/003383, filed on Feb. 6, 2004.

(60) Provisional application No. 60/445,965, filed on Feb. 7, 2003.

(51) Int. Cl.
 *H04J 14/00* (2006.01)
(52) U.S. Cl. ........................... 398/94; 398/160
(58) Field of Classification Search ........... 398/94, 398/177, 197, 97, 160
See application file for complete search history.

(56) References Cited

U.S. PATENT DOCUMENTS

| | | | | |
|---|---|---|---|---|
| 4,449,043 A * | 5/1984 | Husbands | .................... | 250/205 |
| 4,688,260 A * | 8/1987 | Shutterly et al. | .............. | 398/62 |
| 5,063,559 A * | 11/1991 | Marcuse | ...................... | 398/91 |
| 5,394,489 A * | 2/1995 | Koch | ........................... | 385/14 |
| 5,675,432 A * | 10/1997 | Kosaka | ......................... | 398/97 |
| 5,870,217 A * | 2/1999 | Itou et al. | ..................... | 398/97 |
| 5,923,449 A * | 7/1999 | Doerr et al. | .................... | 398/7 |
| 6,097,533 A * | 8/2000 | Atlas | .......................... | 359/337 |
| 6,320,694 B1 | 11/2001 | Ohshima | | |
| 6,335,823 B2 * | 1/2002 | Ohshima et al. | ....... | 359/341.32 |
| 2002/0163690 A1 * | 11/2002 | Yang | .......................... | 359/124 |

FOREIGN PATENT DOCUMENTS

| | | |
|---|---|---|
| JP | 7154371 | 6/1995 |
| JP | 771043 | 7/1995 |
| JP | 11-121849 | 4/1999 |

* cited by examiner

*Primary Examiner*—Christina Y Leung
(74) *Attorney, Agent, or Firm*—Slater & Matsil, L.L.P.

(57) ABSTRACT

Apparatus and method for equalizing a multiplicity of amplifier optical output signals comprised of a combined broadcast optical signal and a narrowcast optical signal having different bands of wavelengths of light by adjusting the power output level of at least one the signals in response to an amplified sample of the signal. A light switch or attenuator and a sensor for determining whether a transmission fiber is in place is connected to each of the multiplicity of optical output signals to allow the optical output signals to be turned on and off for maintenance and repair.

31 Claims, 7 Drawing Sheets

MULTIPORT OPTICAL AMPLIFIER WITH NARROWCAST POWER EQUALIZATION

This application is a continuation of PCT Patent Application No. PCT/US2004/003383, filed on Feb. 6, 2004, entitled Multiport Optical Amplifier With Narrowcast Power Equalization, which claims the benefit of U.S. Provisional Application No. 60/445,965; filed on Feb. 7, 2003, entitled Multiport Optical Amplifier With Narrowcast Power Equalization, which applications are hereby incorporated herein by reference.

TECHNICAL FIELD

The present invention relates generally to a 6 Fiber Ring optical communication system and more specifically to methods and apparatus for optimizing the performance of a multiport optical amplifier used for boosting and distributing more than one set of information carrying signals to multiple users. This is accomplished by equalizing the multiple output signals and enabling maintenance and testing of individual output ports without interrupting the operation of the remaining ports.

BACKGROUND

The communications industry is using more and more optical or light fibers in lieu of copper wire. Optical fibers have an extremely high bandwidth thereby allowing the transmission of significantly more information than can be carried by a copper wire transmission line such as twisted pairs or coaxial cable.

Modern telephone systems require bi-directional communications where each station or user on a communication channel can both transmit and receive. This is true, of course, whether using electrical wiring or optical fibers as the transmission medium. Early telephone communication systems solved this need by simply providing separate copper wires for carrying the communications in each direction, and this approach is still used in older installations where telephony is the only required service. It is also often used even where digital transmission service is demanded as the signals get closer to the end users. Although twisted pairs and coaxial cables are used in homes and distribution terminals close to the home end user, some modern telecommunication systems now use microwave and optic fibers as transmission mediums.

Because of extremely high bandwidths available for use by an optical fiber, a single fiber is quite capable of carrying a great number of communications in both directions. One technique of optical transmission is WDM (wavelength divisional multiplexing) and uses different wavelengths for each direction of travel.

However, because of the extremely high bandwidths of optical fibers, the use of an optical fiber solely as a telephone path is still a very ineffective use of the fiber and, in fact, the available bandwidth of an optical fiber makes it possible to use a transmission technique at one wavelength for telephony and then by the use of WDM technology to use another technique at a second wavelength.

Another area of rapidly growing technology is providing unidirectional TV signals by cable to a multiplicity of subscribers or users (broadcast and/or multicast). In the past, such signals were and still are typically transmitted as electrical signals on coaxial cables (e.g., cable TV). However, the use of optical fibers for transmission allows broadband transmission to a large number of customers and, since the bulk of the transmission of TV signals is one way (i.e., unidirectional), if a single optical fiber were used solely for the TV signals, there would be wasted wavelengths of light.

Therefore, techniques for transmitting bidirectional telephony signals, bidirectional DSL signals and primarily unidirectional TV signals make more efficient use of an optical fiber. However, along with all new technology there usually appears another set of major problems that were either not present in the old technology or were only minor problems. One problem with optical communication systems that provide both digital CATV signals at about 1530/1560 nanometers wavelength of light and digital voice/data signals at around 1310/1490 nanometers wavelength of light is power equalization outputs at the multiple ports.

SUMMARY OF THE INVENTION

These and other problems are generally solved or circumvented, and technical advantages are generally achieved, by preferred embodiments of the present invention that provide apparatus and method for equalizing a multiplicity of amplifier optical output signals comprised of a combination of a broadcast optical signal and a narrowcast optical signal, each having different bands of wavelengths of light.

The equalization is accomplished by controlling a VOA (variable optical attenuator) to adjust the power output level of the narrowcast signal in response to an amplified sample of the narrowcast signal. A light switch or attenuator and a sensor for determining whether a transmission fiber is in place is connected to each of the multiplicity of optical output signals to turn the optical output signals on and off for maintenance and repair.

The apparatus for equalizing the amplified optical signals comprises a first optical signal having a first band of wavelengths of light and a second optical signal having a second band of wavelengths of light that are different than the first band. A VOA receives the second optical signal and provides an adjusted second optical signal in response to a control signal. The first optical signal and the adjusted second optical signal are multiplexed to provide a combined optical signal that is then amplified by an optical amplifier. A sample of the combined first optical signal and the adjusted second optical signal are monitored for purposes of determining the relative power levels of the two signals. A control circuit uses the information of the relative power levels to provide a control signal to the VOA.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts and configurations. The specific embodiments discussed are merely illustrative of specific ways to make and use the invention, and do not limit the scope of the invention.

Figure 1:
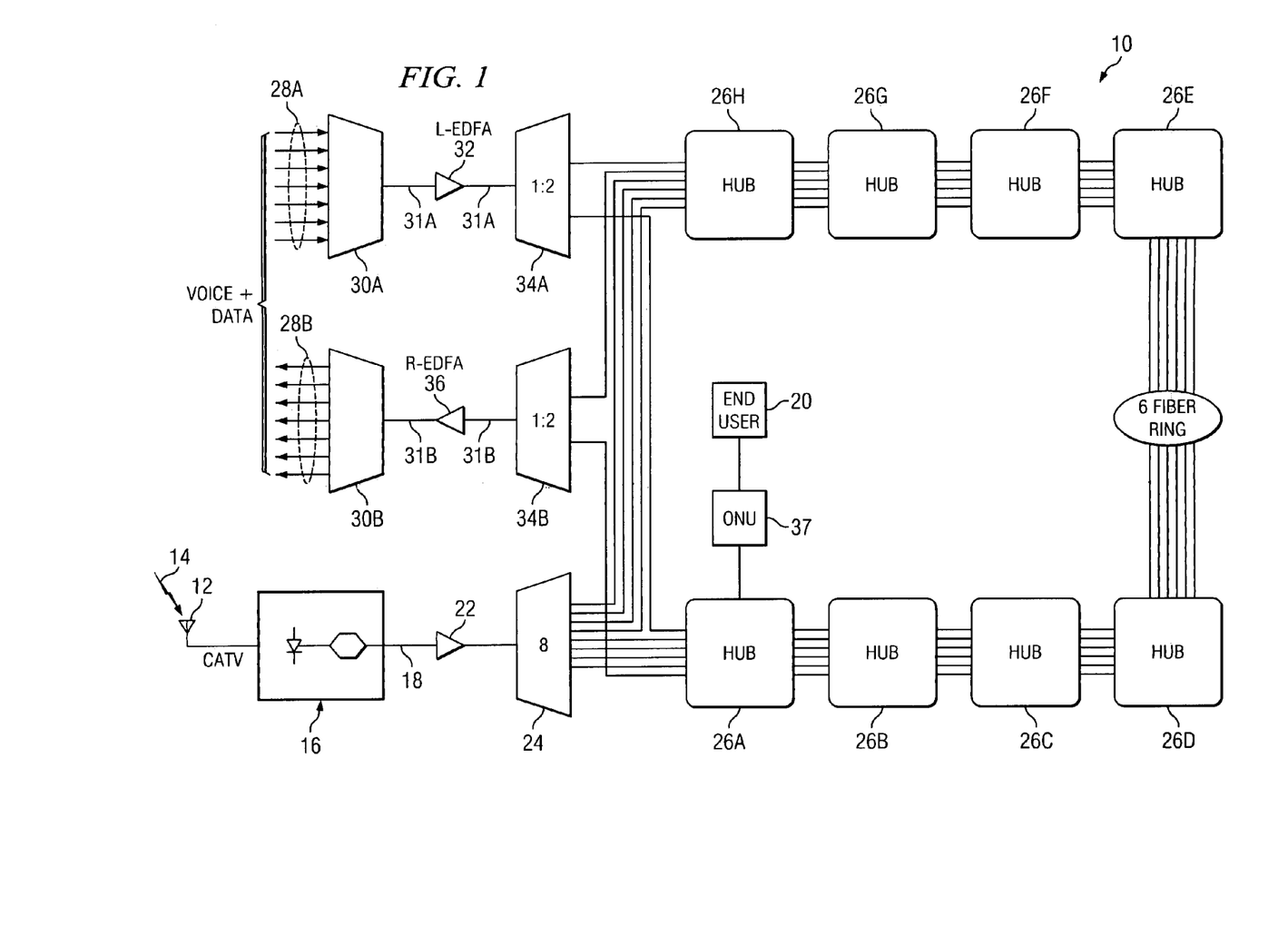
FIG. 1 is a schematic illustration of a "6 Fiber Ring" communication and distribution system suitable for using the advantages of the present invention.

Referring now to FIG. 1, there is shown generally a broadband "6 Fiber Ring" communication system 10 using light waves traveling through optical fibers as the transmission paths. The "6 Fiber Ring" communication system 10 as illustrated includes 8 hubs 26a through 26h each of which provides service to between about 2,000 and 8,000 subscribers. Thus, as an example only, the 6 Fiber Ring system 10 can provide CATV (cable TV) and "voice and data" service to as many as 64,000 subscribers. As shown, in a typical communication system for transmitting television signals there is included a satellite dish 12 for collecting the high-frequency microwave signals indicated by the lightning type arrow 14. These electrical TV signals are provided to conversion circuitry 16, which then modulates light waves having a selected wavelength with the electrical TV signals. These modulated light waves are suitable for transmission along an optical fiber 18. According to one embodiment, light waves in the "C" band and having a wavelength of between about 1530 and 1560 nanometers are often used for such transmission and are shown as being used in the present embodiment although it should be appreciated by those skilled in the art that light waves having other wavelengths would also be appropriate and suitable for use with the present invention. As shown, 6 Fiber Ring communication system 10 is used to transmit signals to an ultimate destination such as the building or home of an end user 20. If the building or home 20 was in close proximity to the station with conversion circuitry 16, the light waves on fiber 18 could be of sufficient power to require no further amplification. However, it is typical that several amplification stations are necessary along the path of the light transmission cables to assure signals of sufficient strength to a multiplicity of customers at various locations along the path. Therefore, as shown in FIG. 1, there is included a first light amplification apparatus 22 which amplifies the light waves before they are separated into 4 fibers by splitter/combining device 24 and enter the 6 Fiber Ring system 10. The 6 Fiber Ring system 10 includes a multiplicity of hubs or distribution terminals such as hubs 26a through 26h, as mentioned above. As will be discussed below, these hubs 26a through 26h also distribute other types of communication services, such as voice and data distribution including normal telephone service commonly referred to as POTS (Plain Old Telephone Service).

Just as the CATV signals are inserted into the 6 Fiber Ring system 10 by splitter/combining device 24, voice/data signals in digital format are also inserted in the system. Referring again to FIG. 1, it is seen that signals carried by a multiplicity of optical fibers 28a and 28b carrying digital voice and data channels are multiplexed and demultiplexed by combining/splitter circuits 30a and 30b respectfully. The output of combining/splitter circuit 30a is injected onto a single fiber 31a, which is provided to an amplifier, such as for example, an EDFA (Erbium Doped Fiber Amplifier) 32 before reaching 1:2 splitter/combining device 34a. Splitter/combining device 34a inserts the downstream voice/data signals into the 6 Fiber Ring system 10. Similarly, the upstream voice/data signals are extracted from the 6 Fiber Ring system 10 by splitter/combining device 34b and injected onto a single fiber 31b. The multiplexed signals from 6 Fiber Ring system 10 are then amplified by EDFA amplifier 36 before being separated by demultiplexer or splitter/combining device 30b.

Figure 2:
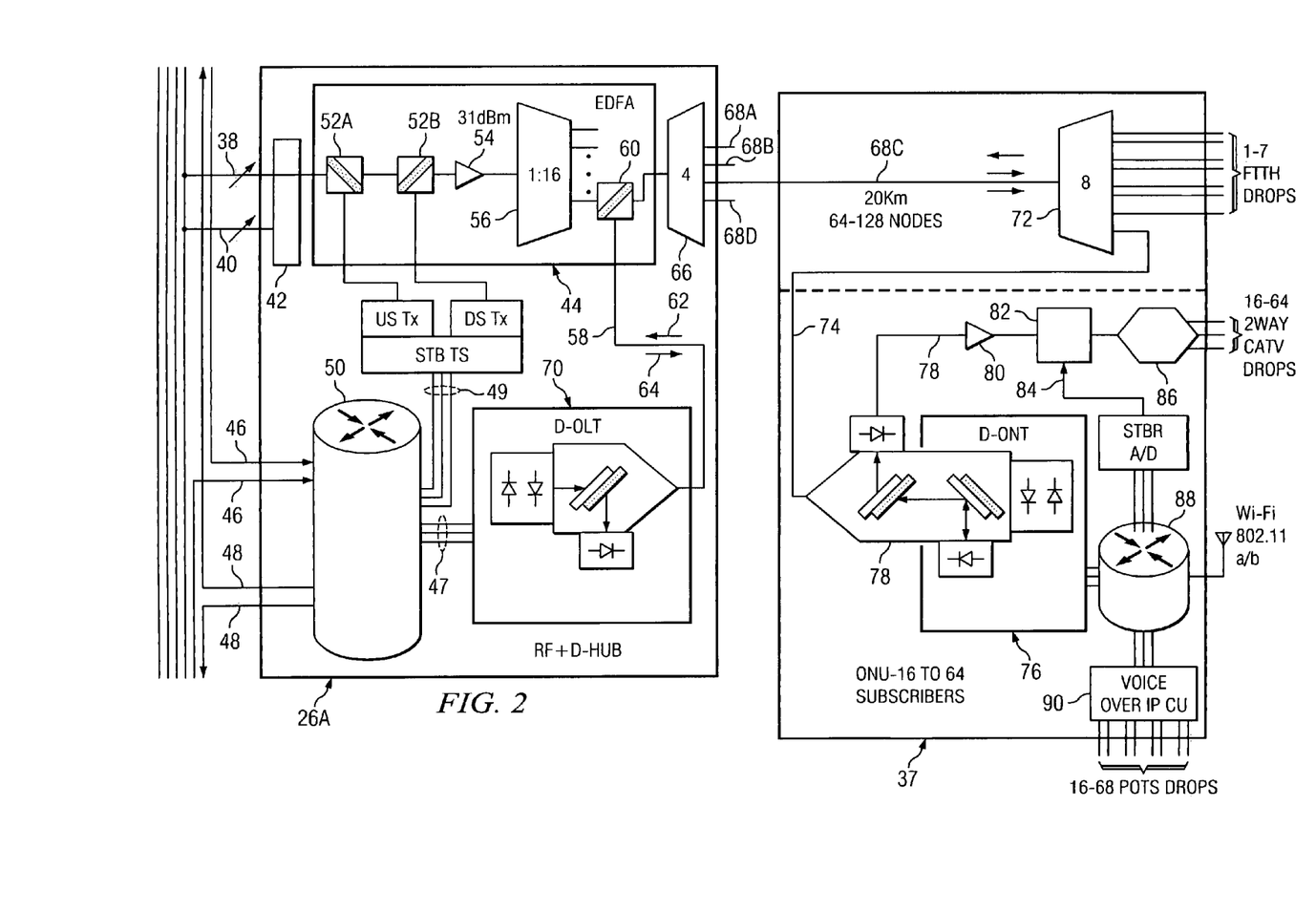
FIG. 2 is a schematic of a typical hub of the 6 Fiber Ring system of FIG. 1 and its connection and interoperation with a distribution terminal or ONU.

Referring now to FIG. 2, there is shown a block diagram of the hub 26a and the ONU (Optical Network Unit) 37. As shown, the amplified CATV signals are received at hub 26a on Broadcast Route 1 cable 38 and Broadcast Route 2 cable 40 and routed to Route Protection Switch 42. Route Protection Switch 42 is set to connect only one of the two fibers 38 and 40 to EDFA amplifier unit 44. In FIG. 2, fiber 38 is illustrated as being connected to EDFA circuit unit 44 through switch 42.

Two of the optical fibers in the 6 Fiber Ring system 10 are used to provide the downstream transmission (fiber 46) and the upstream transmission (fiber 48). The upstream and downstream signals on lines 47 are separated from the STB (Set Top Box) control signals on line 49 by circuitry 50 and connected to lines 47 and 49 respectively. The STB CATV signals are then provided to splitter/combining device 52a and 52b where they are multiplexed in the EDFA circuit unit 44 with the received CATV signals received from switch 42. EDFA unit 44 includes an EDFA optical amplifier 54. The multiplexed signals are provided to EDFA amplifier 54 where they are amplified. The amplified signal is then split and provided onto a multiplicity of fibers, such as the 16 optical fibers as indicated by splitter 56.

Also as shown, each of the outputs of 1:16 splitter 56 will be multiplexed with voice and data signals received on line 58 by a WDM (wave division multiplexer) 60. As indicated by the two arrows 62 and 64, the communication on line 58 is bidirectional and will typically be carried by a light wavelength of between about 1310 and 1490 nanometers. It is, of course, the downstream signals indicated by arrow 62 that are multiplexed with the CATV signals and provided as an output onto a splitter/combining device 66, such as for example, a 1:4 splitter/combining device. Each of the outputs from device 66 are then connected to a fiber such as fibers 68a, 68b, 68c and 68d, which is in turn connected to an ONU such as ONU 37.

Also as shown, after the voice and data signals (V and D) are separated and demultiplexed from the CATV control signal by circuitry 50 as was discussed above, these V and D signals are presented to a D-OLT (Digital Optical Line Termination) circuit 70, which as discussed above, is bidirectional.

Referring now to the ONU 37 of FIG. 2, the bidirectional line 68c is carrying both the single direction CATV signals at between about 1530 and 1560 nanometers typically and the bi-directional voice and data signals at 1310 to 1490 nanometers typically. The signals on line 68c are then split and provided by a splitter/combining device 72, such as a 1:8 splitter/combining device, onto fiber 74. Each of the fibers from splitter/combining device 72 are connected to a D-ONT (Digital Optical Network Termination) 76 which splits out the unidirectional optical CATV signal, demultiplexes and then converts the optical signal to electrical signals on line 78. These electrical CATV signals may then be amplified as indicated by amplifier 80 and provided to diplexer 82 where they are combined with STB control signals on line 84 before being distributed to a multiplicity of locations such as, for example, between 16 and 64 locations as indicated by splitter/combining device 86. The voice/data signals are provided to STBR A/D (Set Top Box Return Analog/Digital) circuitry 88, which in turn provides the Wi-Fi 802.11 a/b signals and the signals to the VOIP-CU (Voice Over Internet Protocol Channel Unit) 90. The VOIP-CU 90 then extracts or demodulates these signals to provide 16 to 64 POTS signals.

Now that the 6 Fiber Ring system has been described, the particular features of the invention can be readily understood by referring to FIG. 2 and again to the EDFA unit 44 in hub 24 of FIG. 1.

As shown in FIGS. 3, 4, 5 and 6, the EDFA unit 100 according to one embodiment of this invention includes the components and elements discussed above with respect to EDFA unit 44 and also includes control electronics 102, a monitor and RF O/E (Radio Frequency Optical to Electrical) unit 104, an additional pair of WDM multiplexer units 106 and 108, a pair of VOA's (Variable Optical Attenuator) 110 and 112, an Enable/Disable switch 114 and a sensor 116 that monitors the output fiber 118 to determine when fiber 118 is connected to a transmission fiber 120. As will be discussed, there is also included a pair of front mounted combination power supplies and cooling fans 122 and 124 to provide redundancy.

Thus, it is seen that Control Electronics 102 will provide selected ones of the following functions:

| Communications & Alarms | Fault Management | Connector & Mating Sensor |
|---|---|---|
| Output Power Equalization | Route Protection | Redundant Power Supplies and Fans |
| Fault Monitoring | Output Enable/Disable | |

Figure 3:
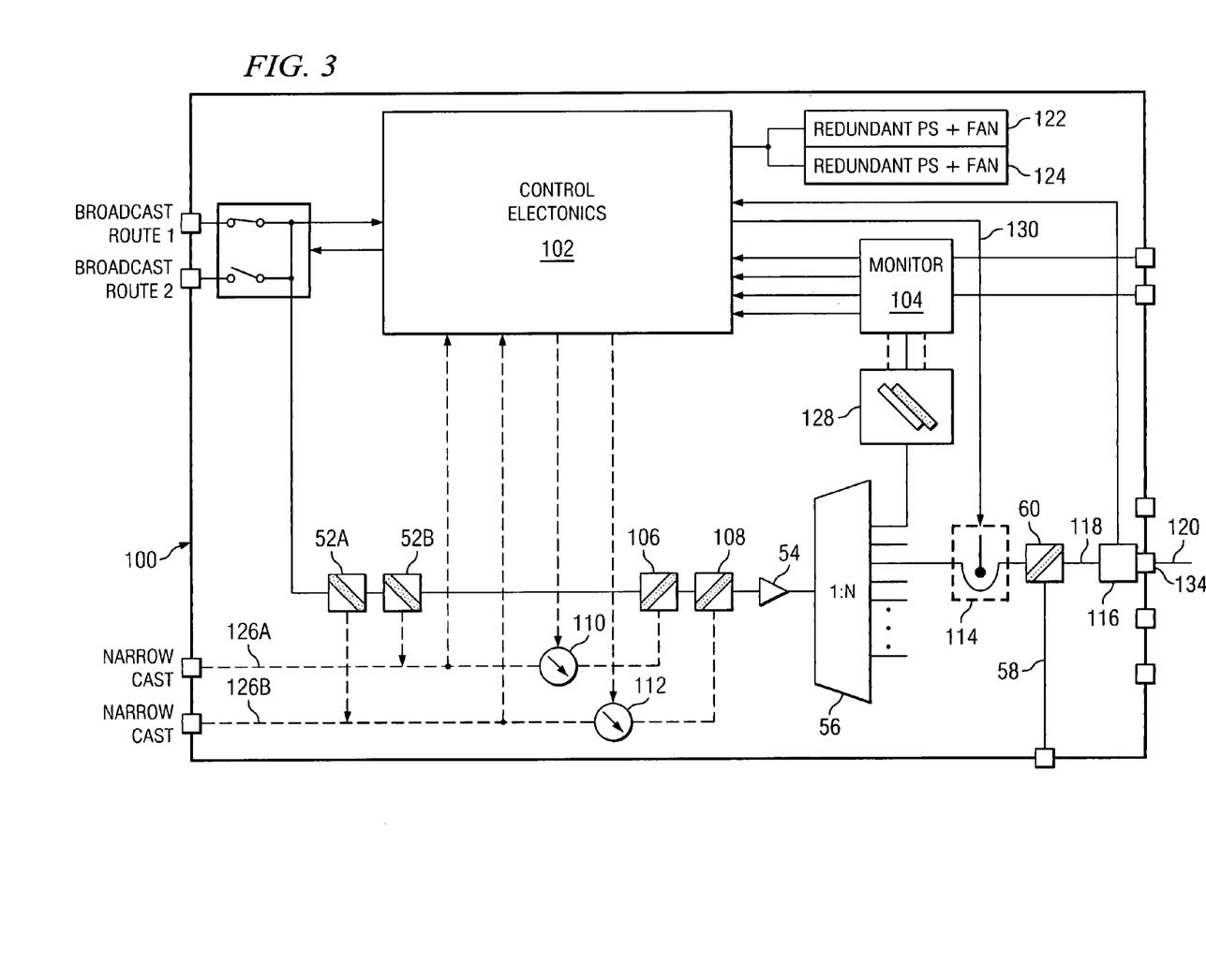
FIG. 3 is a schematic of an amplifier such as an EDFA (Erbium Doped Fiber Amplifier) incorporating the features of the present invention for use in the hub distribution terminal of FIG. 1.
Figure 3A:
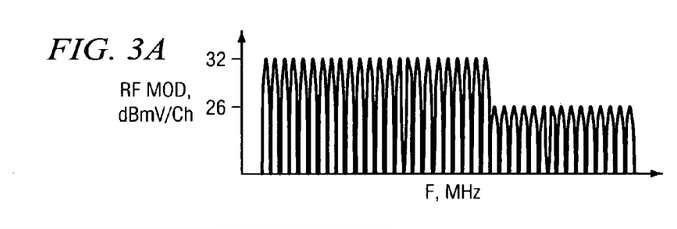
FIG. 3A illustrates the power modulation per channel across the RF spectrum of the combined broadcast and narrowcast signals.

Broadband access and FTTH networks using subcarrier multiplexed transport allow a combination of broadcast video content and targeted video and data (narrowcast) information to be transmitted to the subscriber. This is achieved by combining optical carrier signals carrying the broadcast and narrowcast signals on one fiber and transmitting these combined signals after amplification and splitting to a number of receivers or subscribers. The narrowcast signals are transported on the same fiber as the broadcast signals and are input at the location of the distribution amplifier. The receiver demodulates the subcarrier signals and provides an electrical RF spectrum, which combines the broadcast and narrowcast signals as shown in FIG. 3A. As shown in FIG. 3A, the received RF signals need to be accurate to a relative level of less than 0.5 dB electrical, while the differential gain of the amplifier depends on the wavelength of the signal, and may be more than 1 dB electrical.

The present invention provides for the equalization of the amplified optical signals to an accuracy limited only by the output monitors 104, which are designed to detect the average power and/or the RF modulation signals. Such accuracy can be better than 0.1 dB.

Figure 4:
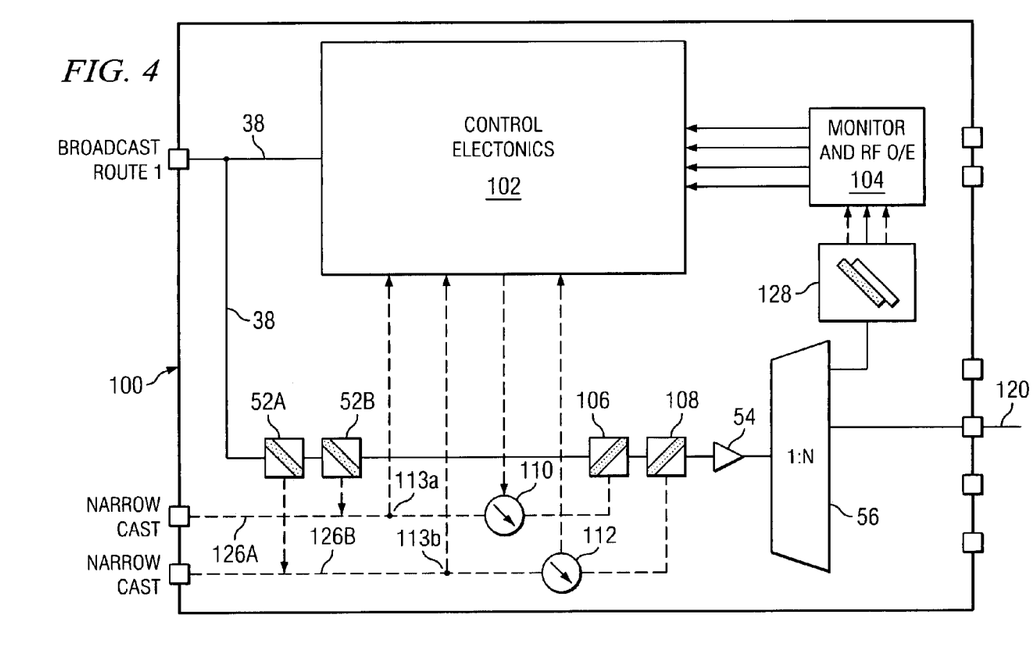
FIG. 4 is a simplified version of the invention as shown in FIG. 3 illustrating management of the narrowcast signal according to the teachings of the invention.

Referring now to FIG. 4, when the narrowcast signals are input individually at the amplifier circuitry as indicated at 126a and 126b, they are attenuated by the appropriate VOA (variable optical attenuator) 110 or 112 in order to be adjusted to the correct relative powers. These attenuated narrowcast signals are then multiplexed by the appropriate splitter/combining device 106 or 108 with the broadcast signal on line 38 before being amplified by the amplifier 54. The received narrowcast signals on lines 126a and 126b may be sampled and the reading provided to Control Electronics 102 as indicated by taps 113a and 113b. Alternately, when the narrowcast signals are transported with the broadcast signal on the same fiber 38, they are demultiplexed by the appropriate splitter/combining devices 52a and 52b before being attenuated by VOA's 110 and 112 and re-multiplexed by combiner/splitter devices 106 and 108.

A portion of the amplified output signal is monitored by monitor circuitry 104 after being demultiplexed either optically by splitter 128 or electrically to determine the output power relative levels, thus providing a feedback signal to the controller allowing the controller 102 to adjust the VOA's to the right level of attenuation.

Multi-output EDFA optimizes broadband access and FTTH economics. However, before maintaining, testing, inspecting, cleaning and disabling of an output port, all other ports in use should be disabled. Disabling all ports even when they are not in use eliminates inadvertent contamination and safety concerns.

Figure 5:
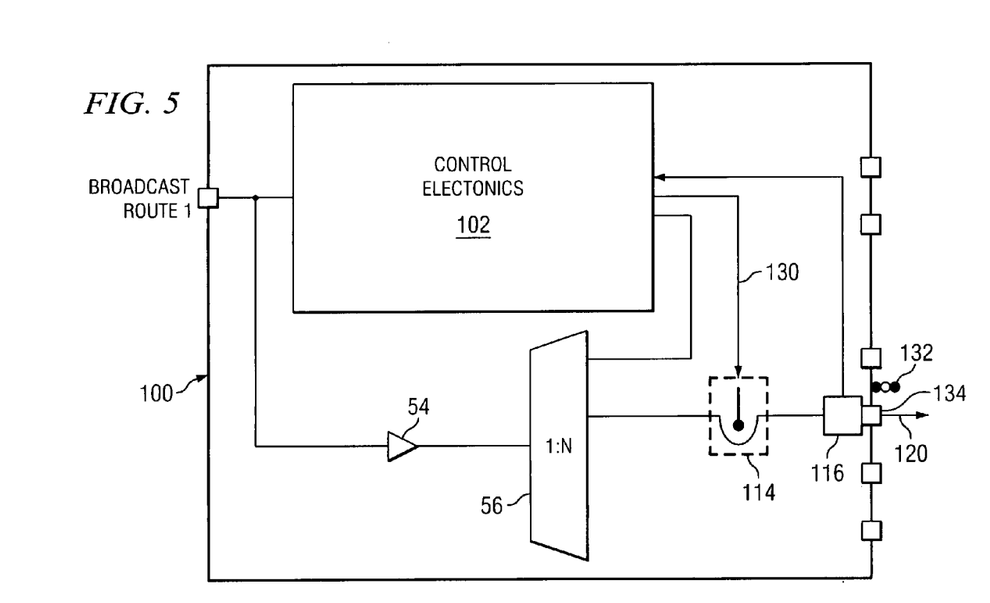
FIG. 5 is a simplified version of the invention as shown in FIG. 3 illustrating the "Port Addressability" features of the present invention.

To solve this problem according to the present invention, and as shown in FIG. 5, there is included a low cost switch or attenuator such as switch 114 on every output port. The switches can be individually addressed by the operator/controller 102 as indicated by line 130.

There is also included a set of indicator lights 132 at the front panel by each output connector. Such indicator lights are activated by the action of the switch 114 when it is activated to indicate that light waves for transmission are present/absent in the output port. The indicator lights 132 have three colors indicating three states, such as for example, the port is live; the port is dead; and the port has been selected by an operator. This third state helps the operator to identify the selected port before he turns it on/off.

A pressure sensor 116 is included on every connector 134, such that when a connector is mated, the sensor 116 indicates to the controller that it is safe to turn the port on. That is, the attenuation can be disengaged from the fiber and light allowed to be emitted to the connector. When the connector 134 is not mated, the sensor 116 indicates a relieved or reduced pressure to the controller, thus enabling the controller 102 to engage the attenuator/switch and turn-off the port.

A major limitation to the distance between the distribution point and the receiver is the variability of the output power of the optical signal carrying the video content. This video signal (wavelength of C Band 1530-1560 nm) is multiplexed with the data signal (1490/1310) on the same fiber. When the multiplexing is done by an external module, the variability is on the order of 2 dB, corresponding to a distance of 8 Km.

Figure 6:
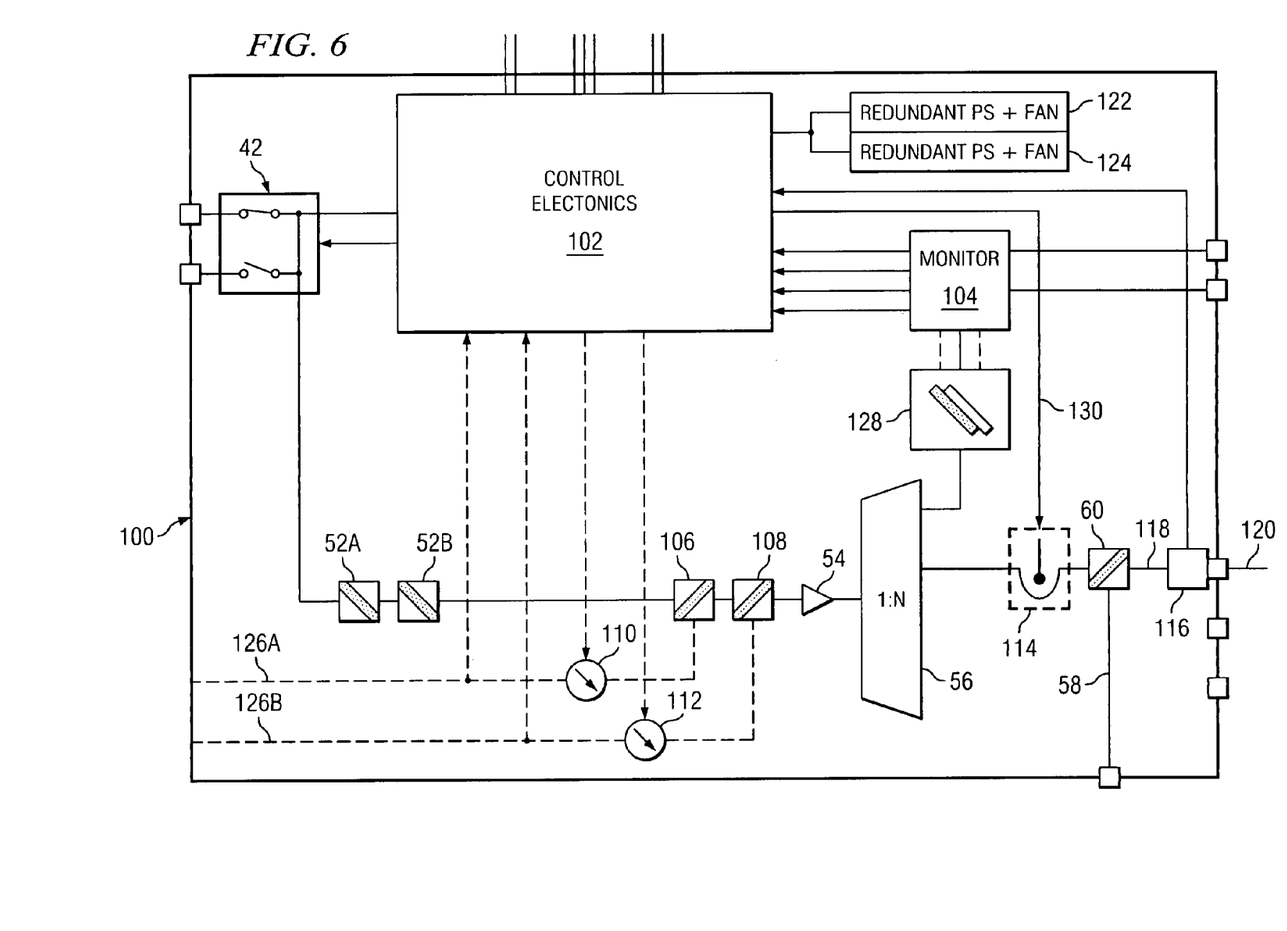
FIG. 6 is a simplified version of the invention as shown in FIG. 3 illustrating the integrated output and the use of redundant power supplies and cooling fans to facilitate maintenance and repair with minimal components and downtime according to the teachings of the present invention.
Figure 7:
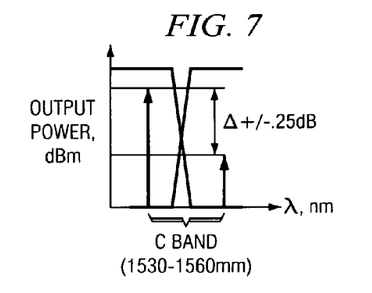
FIG. 7 illustrates the power output across the C-band (transmits the video signals) port to port.

As shown in FIG. 6, the present invention integrates the WDM 60 into the amplifier unit 100, and allows for tuning the C Band output power to within 0.25 dB port to port as illustrated in FIG. 7. A further improvement is the integration of switch 114 and output sensors 116, which allow for further output control.

The high reliability requirements of the telephony signal require redundant fans and power supplies which have to be replaced without disabling the amplifier 54 or disconnecting the transported signals. The present invention allows for this by providing a set of two redundant integrated fan/power supply modules 122 and 124 in FIG. 6, which are mounted/plugged into the front of the amplifier unit 100. This allows for full redundancy with the smallest possible number of replaceable modules.

Figure 8:
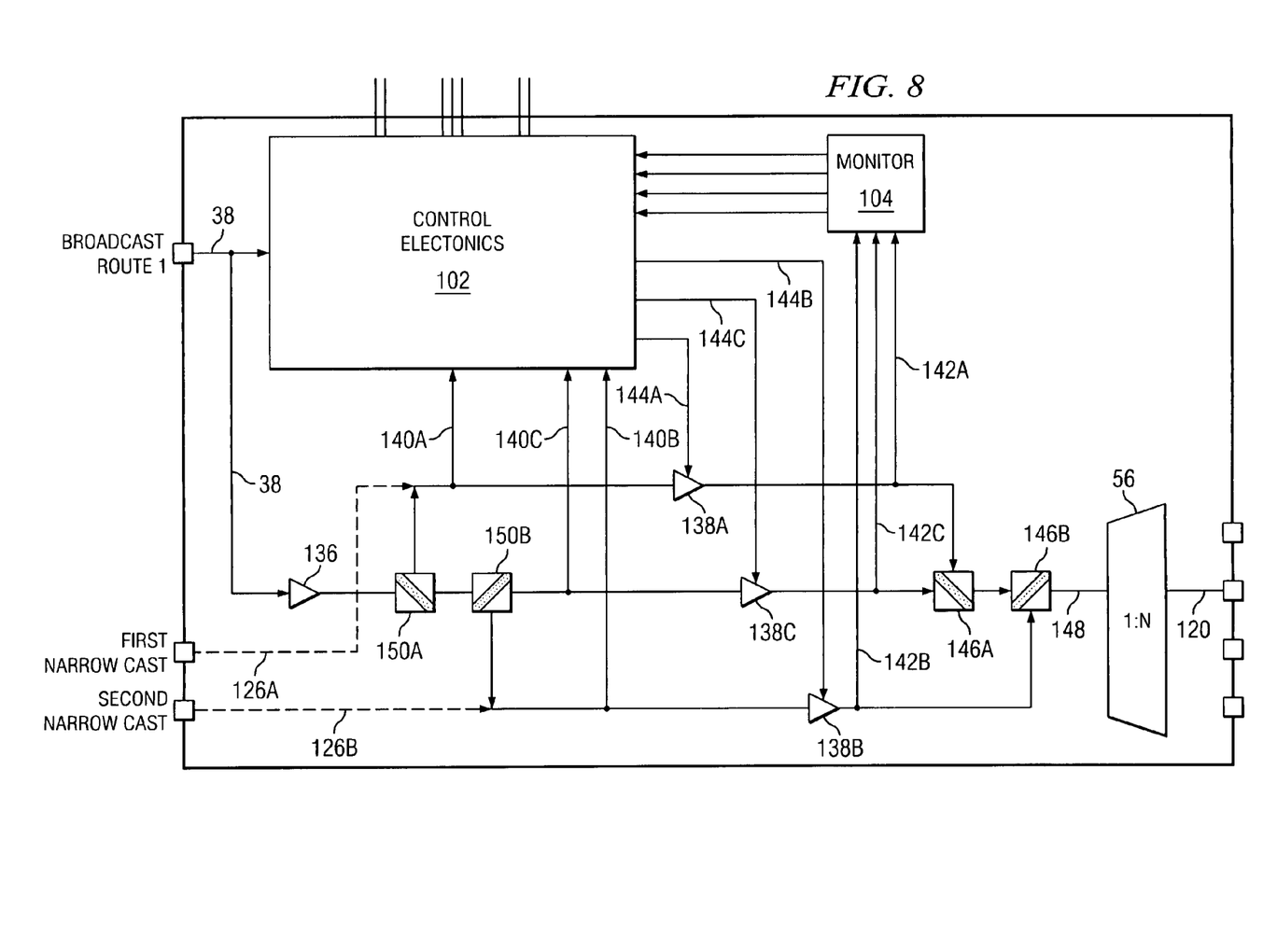
FIG. 8 is a simplified version of the invention as shown in FIG. 3 illustrating an alternate embodiment of the invention for management of the narrowcast signal.

Referring now to FIG. 8, there is illustrated an alternate embodiment to that discussed with respect to FIG. 4 for achieving output equalization. According to this embodiment, there is included a preamplifier 136 for amplifying the broadcast signal on line 38. When first and second narrowcast signals are input individually, such as dotted lines 126a or 126b, these signals are provided directly to booster amplifiers 138a and 138b after being tapped and a monitoring signal is received at inputs on ports 140a and 140b respectively, on Control Electronics 102. In a similar manner, the preamplified broadcast signal is provided to booster amplifier 138c after being tapped and sending a monitor signal to port 140c in Control Electronics 102. The amplified signals from booster amplifiers 138a, 138b and 138c are then tapped and monitored at lines 142a, 142b and 142c as indicated. Thus, from these monitored signals, Control Electronics 102 can individually adjust the output power of the two narrowcast signals and the broadcast signals by adjusting the appropriate booster amplifier by means of control signals on lines 144a, 144b and 144c. Multiplexing or combining circuits 146a and 146b are then used to again multiplex the output signals onto line 148 after the power has been adjusted. The output signal on line 148 is then provided to splitter 56 as discussed above with respect to FIG. 4.

If the two narrowcast signals and the broadcast signals are all received on the single line 38 as multiplexed signals, the combined signals are provided to preamplifier 136. The output of preamplifier 136 is then provided to demultiplexer or splitter circuit 150a. Demultiplexer 150a splits out the first narrowcast signal and sends it to booster amplifier 138a. Similarly, splitter circuit 150b separates the second narrowcast signal from the broadcast signal and sends these separated signals to booster amplifiers 138b and 138c respectively. The remainder of the circuitry then operates the same as was discussed above with respect to the individual first and second narrowcast signals on lines 126a and 126b. Using this embodiment with the three booster amplifiers results in less noise and eliminates the need for the two VOA's 110 and 112.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, means, methods and steps described in the specification. As one of ordinary skill in the art will readily appreciate from the disclosure of the present invention, processes, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. Apparatus for equalizing combined first and second optical output signals transmitted on an optical fiber, said combined first and second optical signals comprising first optical output signals within a first band of wavelengths of light and second optical output signals within a second band of wavelengths of light different than said first band, said apparatus comprising:

first and second optical inputs;

first optical input signals, provided by one of said first and second optical inputs, comprising optical signals within an unrestricted selection of said first band of wavelengths of light;

second optical input signals, provided by the other one of said first and second optical inputs, comprising optical signals within said selected second band of wavelengths of light, said selected second band of wavelengths of light different than said first band of wavelengths, but otherwise unrestricted;

a first optical tap having a first end connected to receive only said first optical input signals provided at said first optical input, and a second end;

a first VOA (Variable Optical Attenuator) downstream of said first optical tap for receiving said first optical input signals within said first band of wavelengths of light provided at said first optical input subsequent to tapping said first optical signal and for attenuating the power level of said first optical input signals in response to a control signal to be substantially the same as the power level of said second optical input signals;

a first optical combining device for combining said power adjusted first optical input signals and said second optical input signals;

an optical amplifier for providing the only optical amplification in said apparatus to said first and second optical input signals and for providing amplified first and second optical output signals comprising at least said power adjusted first optical input signals;

a monitor for sampling and determining the relative power levels of said first and second optical output signals; and a control circuit connected to said monitor for sampling and connected to said first optical input signals and for providing said control signal in response to said relative power levels of said first and second optical output signals.

2. The apparatus of claim 1 and further comprising at least two readily accessible power supplies and cooling fans to provide redundancy.

3. The apparatus of claim 1 wherein said optical amplifier amplifies said power adjusted first optical input and said second optical input signals to amplify said equalized combined first and second optical signals.

4. The apparatus of claim 3 wherein said first optical combining device multiplexes said power adjusted first optical input signals and said second optical input signals.

5. The apparatus of claim 3 and further comprising a splitter for receiving said combined power adjusted first optical input signals and said second optical input signals, and providing a multiplicity of equalized combined first and second optical output signals.

6. The apparatus of claim 5 and further comprising a switch for receiving one of said multiplicity of equalized combined first and second optical output signals and for turning said received one optical output signal on and off in response to a signal from said control circuit.

7. The apparatus of claim 6 and further comprising a monitor for indicating that the output signal is connected to a transmission fiber.

8. The apparatus of claim 3 wherein said combined first and second optical output signals comprise combined first, second and third optical output signals and further comprising a second VOA for receiving said third optical input signals within a third band of wavelengths of light for adjusting the power level of said third optical input signals for equalizing said first, second and third combined optical output signals.

9. The apparatus of claim 1 wherein said control circuit is connected to receive said tapping samples of said first optical input signals before said power attenuated first optical input signals and said second optical input signals are combined by said circuitry for combining.

10. The apparatus of claim 1 wherein said first optical input signals are narrowcast signals and said second optical signals are broadcast signals.

11. The apparatus of claim 10 further comprising narrowcast third optical input signals having a third band of wavelengths of light and a second optical combining device for combining said narrowcast third optical input signals with said combined power adjusted first optical input signals and said second optical input signals to provide combined first, second and third optical output signals.

12. The apparatus of claim 1 wherein said first and second optical input signals can be provided by either of said first and second optical inputs.

13. A method for equalizing combined first and second optical output signals transmitted on an optical fiber wherein said combined first and second optical output signals comprise first optical output signals having a first band of wavelengths of light and second optical output signals having a second band of wavelengths of light, said second band being different than said first band, said method for equalizing comprising the steps of:
providing first and second optical inputs;
receiving first optical input signals having an unrestricted selection of a first band of wavelengths of light on one of said first and second optical inputs;
receiving second optical input signals having a selected second band of wavelengths of light on the other one of said first and second optical inputs, said selected second band of wavelengths of light different than said first band of wavelengths of light, but otherwise unrestricted;
tapping said first optical input signals provided at said first optical inputs, respectively;
attenuating the power level of said received first optical input signals in response to a control signal to equalize said combined first and second optical output signals, said attenuating subsequent to tapping said first optical input signal;
combining said first optical input signals having said attenuated power level and said second optical input signals;
amplifying said first optical input signals having said attenuated power level and said second optical input signals, said amplifying providing the only amplification of said first and second optical input signals;
monitoring samples of said first and second optical output signals; and
receiving samples of said first optical input signals provided by said tapping at a control circuit and said monitored samples of said first and second optical outputs, said control circuit determining the relative power levels of said first and second optical output signals and generating said control signal in response to said relative power signals and said tapped signals.

14. The method of claim 13 wherein said combining step further comprises combining third input optical signals having a third band of wavelengths of light with said first optical input signals with said attenuated power level and said second optical signals to provide combined first, second and third optical input signals.

15. The method of claim 13 further comprising the step of providing redundant power supplies and cooling fans.

16. The method of claim 13 wherein said step of amplifying comprises the step of receiving and amplifying said attenuated first optical input signals and said second optical input to generate said equalized combined first and second optical output signals.

17. The method of claim 16 further comprising the step of splitting said combined equalized output optical signals to provide a multiplicity of combined equalized optical output signals.

18. The method of claim 17 further comprising the step of switching one of said multiplicity of combined equalized optical output signals ON and OFF in response to a control signal.

19. The method of claim 18 further comprising the step of monitoring at least one of said multiplicity of combined equalized optical output signals to determine if said output signal is connected to a transmission fiber.

20. The method of claim 13 wherein the step of monitoring said first optical input signals is performed prior to said combining step.

21. The method of claim 13 wherein said step of providing first optical input signals comprises providing narrowcast optical input signals and said step of providing second optical signals comprising providing broadcast optical input signals.

22. Apparatus for equalizing combined first and second optical output signals transmitted on an optical fiber, said combined first and second optical signals comprising first optical output signals within a first band of wavelengths of light and second optical output signals within a second band of wavelengths of light different than said first band, said apparatus comprising:
first and second optical inputs;
first optical input signals, provided by one of said first and second optical inputs, comprising optical signals within an unrestricted selection of a first band of wavelengths of light;
second optical input signals, provided by the other one of said first and second optical inputs, comprising optical signals within a selected second band of wavelengths of light, said selected second band of wavelengths of light different than said first band of wavelengths, but otherwise unrestricted;
a first optical tap having a first end connected to receive only said first optical input signals provided at said first optical input, and a second end;
a plurality of optical amplifiers, each for receiving individual optical input signals, said plurality comprising only one amplifier for each optical input signal including said first and second optical input signals and for adjusting the power level of at least said first and second optical input signals in response to control signals, and wherein ones of said plurality of optical amplifiers providing the only optical amplification in said apparatus to said first and second optical input signals;

a first optical combining device for combining said power adjusted first optical input signals and said second optical input signals;

a monitor for sampling the relative power levels of said first and second optical output signals; and a control circuit connected to said monitor for sampling and connected to said first optical input signals and for providing said control signals in response to said relative power levels of said first and second optical output signals.

23. The apparatus of claim 22 and further comprising a splitter for receiving said equalized combined output optical signals and providing a multiplicity of equalized combined output signals.

24. The apparatus of claim 23 and further comprising a switch for receiving one of said multiplicity of equalized combined output optical signals and for turning said received one output signal on and off in response to a signal from said control circuit.

25. The apparatus of claim 24 and further comprising a monitor for indicating that the received one output signal is connected to a transmission fiber.

26. The apparatus of claim 22 wherein said first and second combined optical output signals comprises first, second and third combined optical output signals and further comprising a third amplifier for receiving third input optical signals within a third band of wavelengths of light for providing third optical signals having a power level adjusted for equalizing said first, second and third combined output signals.

27. A method for equalizing combined first and second optical output signals transmitted on an optical fiber wherein said combined first and second optical output signals comprise first optical output signals having a first band of wavelengths of light and second optical output signals having a second band of wavelengths of light, said second band being different than said first band, said method for equalizing comprising the steps of:

providing first and second optical inputs;

receiving first optical input signals having an unrestricted selection of a first band of wavelengths of light on one of said first and second optical inputs;

receiving second optical input signals having a selected second band of wavelengths of light on the other one of said first and second optical inputs, said selected second band of wavelengths of light different than said first band of wavelengths of light, but otherwise unrestricted;

tapping said first optical input signals provided at said first optical input;

amplifying said received first optical input signals by a first amplifier in response to a control signal to equalize said combined first and second optical output signals and providing said received second optical input signals to a second amplifier having a second and different control signal that is separate from said first amplifier and subsequent to receiving said first optical input signal, said first and second amplifiers providing the only optical amplification of said first and second optical input signals;

combining said first optical input signals with said amplified power level and said second optical input signals;

monitoring samples of said first and second optical output signals; and receiving samples of said first optical input signals provided by said tapping step at a control circuit and said monitored samples of said first and second optical outputs, said control circuit determining the relative power levels of said first and second optical output signals and generating a control signal in response to said relative power signals and said tapped signals.

28. The method of claim 27 wherein said step of combining comprises combining said amplified first optical input signals and said second optical input signals subsequent to said second optical signals passing through said second optical amplifier.

29. The method of claim 28 further comprising the step of splitting said combined equalized output optical signals to provide a multiplicity of equalized optical output signals.

30. The method of claim 29 further comprising the step of switching one of said multiplicity of combined equalized optical output signals ON and OFF in response to a control signal.

31. The method of claim 30 further comprising the step of monitoring at least one of said multiplicity of combined equalized optical output signals to determine if said output signal is connected to a transmission fiber.

* * * * *